(12) United States Patent
Chatterjee et al.

(10) Patent No.: US 8,255,739 B1
(45) Date of Patent: Aug. 28, 2012

(54) ACHIEVING DATA CONSISTENCY IN A NODE FAILOVER WITH A DEGRADED RAID ARRAY

(75) Inventors: Paresh Chatterjee, Fremont, CA (US); Sharon Samuel Enoch, Newark, CA (US); Anandh Mahalingam, Newark, CA (US); Suresh Grandhi, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 183 days.

(21) Appl. No.: 12/492,509

(22) Filed: Jun. 26, 2009

Related U.S. Application Data (60) Provisional application No. 61/076,922, filed on Jun. 30, 2008.

(51) Int. Cl.
*G06F 11/00* (2006.01)
(52) U.S. Cl. ....... 714/6.1; 714/6.13; 714/6.22; 714/6.23
(58) Field of Classification Search ............... 714/6, 6.1, 714/6.13, 6.22, 6.23
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,680,538 A * | 10/1997 | Jones et al. .................. | 714/5.11 |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,151,659 A * | 11/2000 | Solomon et al. ............... | 711/114 |
| 6,173,377 B1 | 1/2001 | Yanai et al. | |
| 6,523,032 B1 * | 2/2003 | Sunkara et al. ........................ | 1/1 |
| 6,671,705 B1 | 12/2003 | Duprey et al. | |
| 6,915,448 B2 * | 7/2005 | Murphy et al. ................... | 714/6 |
| 7,143,308 B2 * | 11/2006 | Tseng et al. ................. | 714/6.22 |
| 7,308,601 B2 * | 12/2007 | Ikeuchi et al. ............... | 714/6.22 |
| 7,406,621 B2 * | 7/2008 | Lubbers et al. ................ | 714/6.1 |
| 7,412,563 B2 * | 8/2008 | Subbarao et al. ............. | 711/114 |
| 7,536,586 B2 * | 5/2009 | Ahmadian et al. ................. | 714/6 |

(Continued)

OTHER PUBLICATIONS

U.S. Appl. No. 12/013,110, filed Jan. 11, 2008 entitled "Maintaining Data Consistency in Mirrored Cluster Storage Systems Using Bitmap Write-Intent Logging", Inventors: Chatterjee et al.

(Continued)

*Primary Examiner* — Scott Baderman
*Assistant Examiner* — Loan L. T. Truong
(74) *Attorney, Agent, or Firm* — McKeon, Meunier, Carlin & Curfman, LLC (57) ABSTRACT

Technologies are described herein for achieving data consistency during a failover from a primary node to a secondary node in a storage cluster with a shared RAID array in a degraded mode. When the primary storage node receives a write I/O operation, a volume module on the primary node reads the missing data strip data from the failed disk belonging to the stripe targeted by the write I.O operation. The primary storage node communicates the missing data strip to the secondary storage node, which writes the missing strip data to an outstanding strip log. Upon the failure of the primary node, the secondary storage node reads the missing data strip from the outstanding strip log and writes the missing data strip to the shared RAID array, thus restoring data consistency to the stripe of the RAID array containing the missing data strip.

16 Claims, 7 Drawing Sheets

U.S. PATENT DOCUMENTS

| | | | | |
|---|---|---|---|---|
| 7,596,712 | B1* | 9/2009 | Gole et al. | 714/4.4 |
| 7,689,675 | B2* | 3/2010 | Tucker | 709/220 |
| 2002/0112023 | A1* | 8/2002 | Karamanolis et al. | 709/217 |
| 2002/0124139 | A1* | 9/2002 | Baek et al. | 711/114 |
| 2003/0041283 | A1* | 2/2003 | Murphy et al. | 714/13 |
| 2003/0115412 | A1* | 6/2003 | Franklin et al. | 711/114 |
| 2005/0166083 | A1* | 7/2005 | Frey et al. | 714/6 |
| 2005/0228942 | A1* | 10/2005 | Nichols et al. | 711/114 |
| 2005/0234934 | A1* | 10/2005 | Mackay et al. | 707/100 |
| 2005/0278476 | A1* | 12/2005 | Teske et al. | 711/100 |
| 2006/0236064 | A1 | 10/2006 | Niles et al. | |
| 2006/0242540 | A1* | 10/2006 | Cherian et al. | 714/766 |
| 2007/0079105 | A1* | 4/2007 | Thompson | 711/201 |
| 2007/0174657 | A1* | 7/2007 | Ahmadian et al. | 714/4 |
| 2008/0005612 | A1* | 1/2008 | Arai | 714/6 |
| 2008/0028107 | A1* | 1/2008 | Cherian et al. | 710/9 |
| 2008/0126840 | A1* | 5/2008 | Chen et al. | 714/5 |
| 2008/0201616 | A1* | 8/2008 | Ashmore | 714/57 |
| 2008/0270704 | A1* | 10/2008 | He et al. | 711/129 |
| 2009/0044043 | A1* | 2/2009 | Cherian et al. | 714/6 |

OTHER PUBLICATIONS

U.S. Appl. No. 12/013,116, filed Jan. 11, 2008 entitled "Maintaining Data Consistency in Mirrored Cluster Storage Systems With Write-Back Cache", Inventors: Chatterjee et al.

U.S. Official Action dated Nov. 22, 2010 in U.S. Appl. No. 12/013,110.

* cited by examiner

ACHIEVING DATA CONSISTENCY IN A NODE FAILOVER WITH A DEGRADED RAID ARRAY

CROSS-REFERENCE TO RELATED APPLICATION

This application claims the benefit of U.S. provisional patent application No. 61/076,922 filed on Jun. 30, 2008, entitled "Node Failover in a Networked Raid 5 Data Storage Environment," which is expressly incorporated herein by reference in its entirety.

BACKGROUND

Clustered storage systems allow multiple storage computers, or "nodes," to work together in a coherent storage system. Clustered storage systems utilize various configurations of multiple processors, controllers, memory, and other resources to increase the performance of the storage system as well as provide redundancy and high availability.

One such configuration is a high availability cluster with two nodes: a primary node and a secondary node, each having its own physical storage devices (disks). In an Active-Passive mode configuration, write I/Os may be served by the primary node while reads may be served by both of the nodes. Every write I/O operation to the primary node may be mirrored to the secondary node before the operation is acknowledged as complete to the initiator of the I/O. In the event of a failure of the primary node, the secondary node having the mirrored data from the failed node can continue to service all I/Os. Technologies, such multipath I/O ("MPIO"), may make such node-failovers transparent to the initiators. However, in such a mirrored configuration, only half of the actual physical storage space is available to the initiators.

Another configuration involves the sharing of the physical storage devices, such as a redundant array of inexpensive disks ("RAID"), by the clustered nodes. In this scenario, the RAID array is exclusively owned by the primary node which services all I/O operations, while the secondary node acts as a "hot spare" and takes control of disks in the event of a failure of the primary node. The failover to the secondary node may be made transparent to the initiators of I/Os, since the primary node has informed the secondary node of all write I/O operations that have been transacted on the primary. Since the RAID array in this configuration is shared, it may be configured in a less redundant RAID level, such as a RAID 5, in order to gain more storage capacity over the mirrored configuration.

When the primary node fails, the secondary node may replay any outstanding writes that were not completed by the primary node to ensure no data is lost. However, in the case where the RAID array is in a degraded mode, such as the failure of a disk drive in the array, the data stored in the RAID array may not be in a consistent state, and consistency may not be recoverable due to the degraded state.

It is with respect to these considerations and others that the disclosure made herein is presented.

SUMMARY

Technologies are described herein for achieving data consistency during a failover from a primary storage node to a secondary storage node in a storage cluster with a shared RAID array in a degraded mode. Through the utilization of the technologies and concepts presented herein, the secondary storage node can ensure that the data on the RAID array is in a consistent state before replaying any outstanding writes for the RAID array or servicing new I/Os from initiators.

According to one embodiment, the primary storage node receives a write I/O operation for the shared RAID array. Upon receiving the write I/O operation, a volume module on the primary storage node determines if the shared RAID array is in a degraded mode. If the shared RAID array is in a degraded mode, the volume module on the primary node reads the missing data strip data from the failed disk belonging to the stripe targeted by the write I.O operation. The missing data strip is then communicated to the volume module on the secondary storage node, which writes the missing data strip to an outstanding strip log.

During subsequent processing of the write I/O operation, the primary storage node fails. The failure of the primary storage node is detected by the volume module of the secondary storage node. Upon taking ownership of the RAID array, the volume module of the secondary storage node reads the missing data strip from the outstanding strip log and writes the missing data strip to the shared RAID array, thus restoring data consistency to the stripe of the RAID array containing the missing data strip.

It should be appreciated that the above-described subject matter may also be implemented as a computer-controlled apparatus, a computer process, a computing system, or an article of manufacture, such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for achieving data consistency during a failover from a primary node to a secondary node in a storage cluster with a shared RAID array in a degraded mode. While the subject matter described herein is presented in the general context of program modules that execute on one or more storage computers of a storage system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, microprocessor-based systems, programmable consumer electronics, minicomputers, mainframe computers, special-purposed hardware devices, network appliances, and the like.

In the following detailed description, references are made to the accompanying drawings that form a part hereof, and that show, by way of illustration, specific embodiments or examples. Like numerals represent like elements throughout the several figures.

Figure 1:
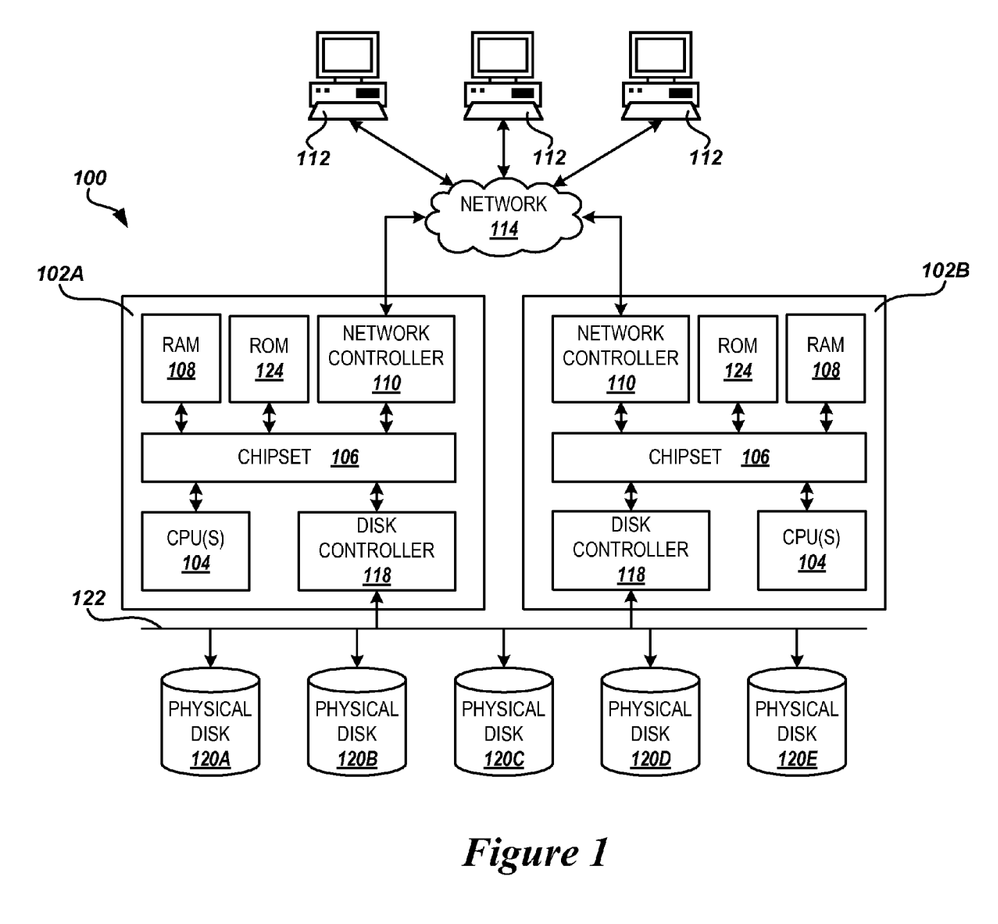
FIG. 1 is a computer architecture diagram illustrating a computer hardware architecture for a storage cluster including redundant storage nodes and a shared RAID array, according to embodiments presented herein.

FIG. 1 and the following discussion are intended to provide a brief, general description of a suitable computing environment in which the embodiments described herein may be implemented. Those skilled in the art will appreciate that the embodiments described herein may be practiced with other computer system configurations, multiprocessor systems, microprocessor-based or programmable consumer electronics, minicomputers, mainframe computers, and the like. The embodiments described herein may also be practiced in distributed computing environments, where tasks are performed by remote processing devices that are linked through a communications network. In a distributed computing environment, program modules may be located in both local and remote memory storage devices.

In particular, FIG. 1 shows an exemplary storage cluster 100 including two storage controller computers, or storage nodes 102A, 102B (also referred to herein as storage node 102). Each storage node 102 includes a baseboard, or "motherboard," which is a printed circuit board to which a multitude of components or devices may be connected by way of a system bus or other electrical communication paths. In one illustrative embodiment, one or more central processing units ("CPUs") 104 operate in conjunction with a chipset 106. The CPUs 104 are standard programmable processors that perform arithmetic and logical operations necessary for the operation of the storage node 102.

The CPUs 104 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 106 provides an interface between the CPUs 104 and the remainder of the storage node 102. The chipset 106 also provides an interface to a random access memory ("RAM") 108 used as the main memory in the storage node 102. The chipset 106 also includes functionality for providing network connectivity through a network controller 110, such as a gigabit Ethernet adapter. The network controller 110 is capable of connecting the storage nodes 102A, 102B to each other as well as to other client computers 112 acting as initiators of I/O operations over a network 114. The network may be an Ethernet or Gigabyte Ethernet LAN, a fiber ring, a fiber star, wireless, optical, satellite, a WAN, a MAN, or any other network technology, topology, protocol, or combination thereof.

According to embodiments, each storage node 102A, 102B is connected to a number of physical storage devices, such as the physical disks 120A-120E (also referred to herein as physical disks 120) shown in FIG. 1. The physical disks 120A-120E provide the data storage capacity required for the storage node 102 to store data and service I/O operations initiated by the client computers 112 over the network 114. A disk controller 118 allows the storage node 102 to communicate with the physical disks 120A-120E connected to the storage node. The disk controller 118 may interface with the physical disks 120A-120E through a serial advanced technology attachment ("SATA") interface, a small computer system interface ("SCSI"), a fiber channel ("FC") interface, a serial attached SCSI interface, or other standard interface for physically connecting and transferring data between computers and physical storage devices. In addition, the disk controller 118 may include hardware-level RAID services, as will be discussed in more detail below in regard to FIG. 2.

According to embodiments, the physical disks 120A-120E may be connected to the storage node 102 through a bus 122 that allows the disk controller 118 to communicate with the disk drives. In one embodiment, the physical and electrical structure of the bus 122 may be based upon the storage bridge bay ("SBB") specification. The SBB specification defines mechanical, electrical, and low-level enclosure management requirements for a single enclosure that supports the connection of a number of controllers or storage nodes 102 as well as multiple physical disks 120 from a variety of hardware and system vendors. The SBB mid-plane provides the bus 122 that allows multiple storage nodes 102A, 102B to be connected to and communicate with the physical disks 120A-120E concurrently, as well as facilitates communication between the storage nodes 102A, 102B. It will be appreciated that the storage nodes 102 and the physical disks 120 may be interconnected through a bus 122 other than the SBB mid-plane described herein.

The storage node 102 may store data on the physical disks 120 by transforming the physical state of the device to reflect the information being stored. The specific transformation of physical state may depend on various factors, in different implementations of this description. Examples of such factors may include, but are not limited to, the technology used to implement the physical storage devices, whether the physical storage devices are characterized as primary or secondary storage, and the like. For example, the storage node 102 may store data to the physical disks 120 by issuing instructions to the disk controller 118 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The storage node 102 may further read information from the physical disks 120 by detecting the physical states or characteristics of one or more particular locations within the devices.

In addition to the physical disks 120 described above, the storage node 102 may have access to other computer-readable storage medium to store and retrieve information, such as program modules, data structures, or other data. It should be appreciated by those skilled in the art that computer-readable storage media can be any available media that can be accessed by the storage node 102. By way of example, and not limitation, computer-readable storage media may include volatile and non-volatile, removable and non-removable media implemented in any method or technology for. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the storage node 102.

The computer-readable storage media may store an operating system (not shown) utilized to control the operation of the storage node 102. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The computer-readable storage media may store other system or application programs and data utilized by the storage node 102. In one embodiment, the computer-readable storage medium may be encoded with computer-executable instructions that, when loaded into the storage node 102, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the storage node 102 by specifying how the CPUs 104 transitions between states, as described above. According to one embodiment, the storage node 102 may have access to computer-readable storage media storing computer-executable instructions that, when executed by the computer system, perform the routine 600 for achieving data consistency in a node failover with a shared RAID array in degraded mode, described below in regard to FIGS. 6A and 6B.

The chipset 106 may also provide an interface to a computer-readable storage medium such as a ROM 124 or NVRAM for storing a firmware that includes program code containing the basic routines that help to start up the storage node 102 and to transfer information between elements within the storage node 102. The ROM 124 or NVRAM may also store other software components necessary for the operation of the storage node 102 in accordance with the embodiments described herein. It will be appreciated that the storage node 102 may not include all of the components shown in FIG. 1, may include other components that are not explicitly shown in FIG. 1, or may utilize an architecture completely different than that shown in FIG. 1.

Figure 2:
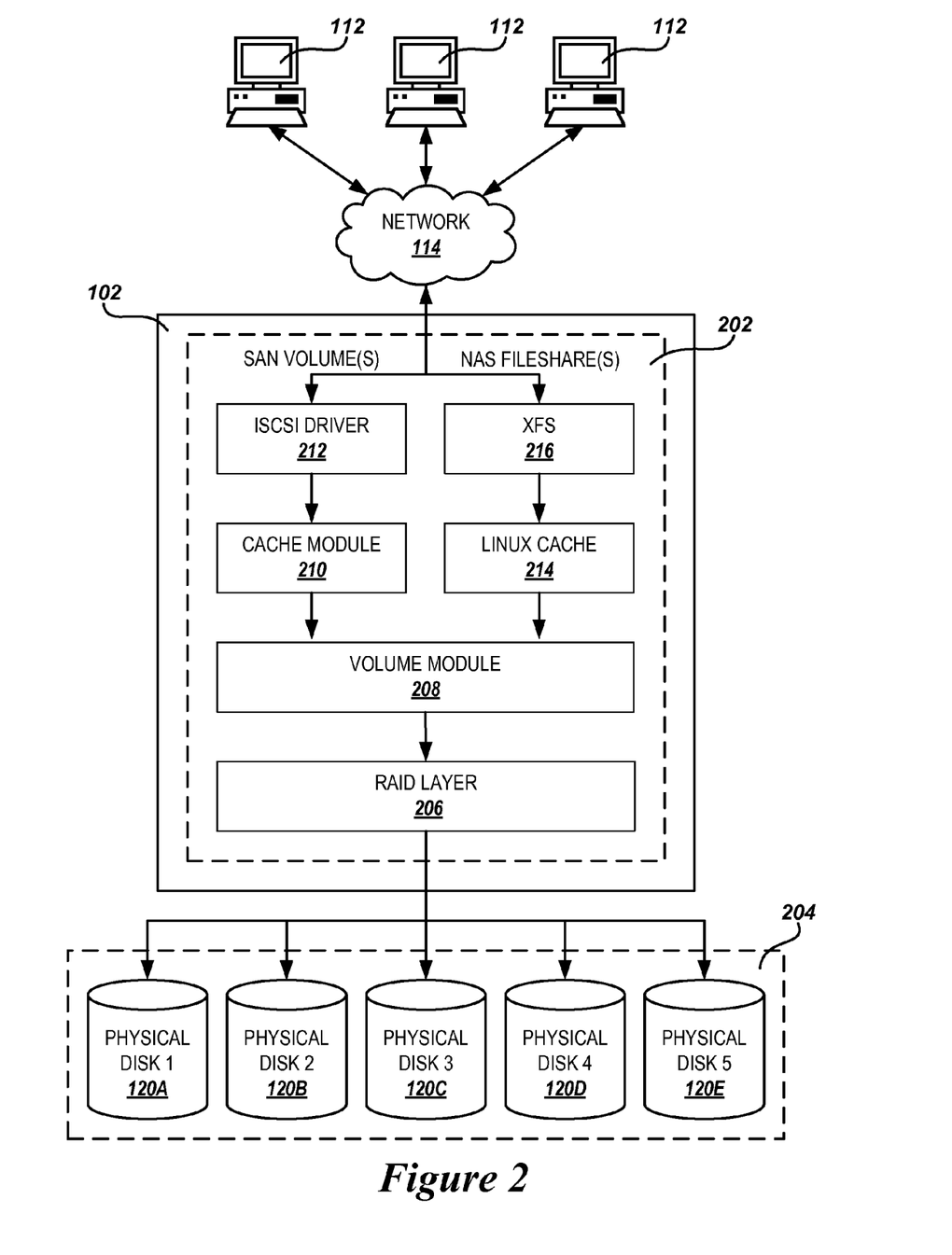
FIG. 2 is a block diagram showing aspects of a storage node and the associated RAID array, including several software components provided by the embodiments presented herein.

FIG. 2 shows further aspects of a storage node 102, including an exemplary storage stack 202 containing software components and interfaces utilized by the embodiments described herein. According to embodiments, the physical disks 120A-120E connected to the storage node 102 are organized into a redundant array of inexpensive disks ("RAID") array 204. The RAID level utilized for the RAID array 204 may depend on a number of factors, such as the redundancy level, performance requirements, and reliability of the array desired. In one embodiment, the physical disks 120A-120E are organized into a RAID 5 array. It will be appreciated, however, that the embodiments described herein may be utilized with storage nodes 102 connected to RAID arrays 204 organized at other standard RAID levels where redundant information is included in the storage of the array, including RAID 4 and RAID 6, as well as hybrid levels such as RAID 50 or RAID 60.

The storage node 102 accesses the RAID array 204 through a RAID layer 206. The RAID layer 206 abstracts the organization of the RAID array 204 and presents a logical block-level interface to higher layers in the storage stack 202. The RAID layer 206 may be implemented on the storage node 102 in software, hardware, or a combination thereof. In one embodiment, the RAID layer is provided by the MD kernel extension provided by the LINUX operating system. In another embodiment, the RAID layer 206 may be provided by a MEGARAID® storage adapter from LSI Corporation of Milpitas, Calif., installed in the storage node 102. It will be appreciated that the RAID layer may be implemented by software and/or hardware components from a variety of vendors beyond those described herein.

A volume module 208 utilizes the block-level interface provided by the RAID layer 206 to manage the storage provided by the RAID array 204 and service I/O operations initiated by the client computers 112 across the network 114. The volume module 208 may implement a variety of storage management functions, such as volume virtualization, thin provisioning, snapshots, locking, data replication, etc. Volume virtualization provides the facility to create and manage multiple, logical volumes on the RAID array 204, as well as expand a logical volume across multiple storage nodes within a storage cluster. Thin provisioning provides for the allocation of physical capacity of the RAID array 204 to logical volumes on an as-needed basis. Snapshots provide functionality for creating and utilizing point-in-time snapshots of the contents of logical storage volumes. The locking functionality allows for synchronizing I/O operations within the storage node 102 or across nodes within the storage cluster 100. Data replication provides functionality for replication of data within the storage node 102 or across nodes within the storage cluster 100.

According to embodiments, the volume module 208 is further responsible for coordinating the actions of multiple storage nodes 102 within a storage cluster 100. This includes ensuring data consistency of the underlying RAID array 204 in the event of a failover from a primary storage node to a secondary storage node, as will be described below in regard to FIGS. 3-6B. The volume module 208 may be implemented on the storage node 102 in software, hardware, or a combination thereof. It will be appreciated that the volume module 208 may be capable of operating with a variety of underlying RAID layers 206, each providing various levels of functionality and programming interfaces ("APIs").

A number of additional layers may be provided by the storage stack 202 above the volume module 208, depending upon the access mechanism utilized by the client computers 112 to access the data stored in the RAID array 204 across the network 114. In particular, a storage area network ("SAN") path may be provided that utilizes a cache module 210 and an internet small computer systems interface ("iSCSI") driver 212. A network attached storage ("NAS") path may also be provided that utilizes a LINUX cache 214 and the XFS high-performance journaling file system 216. The storage node 102 exposes logical storage volumes through a block-level interface via the SAN path, while fileshares are exposed through a file-level interface via the NAS path.

Figure 3:
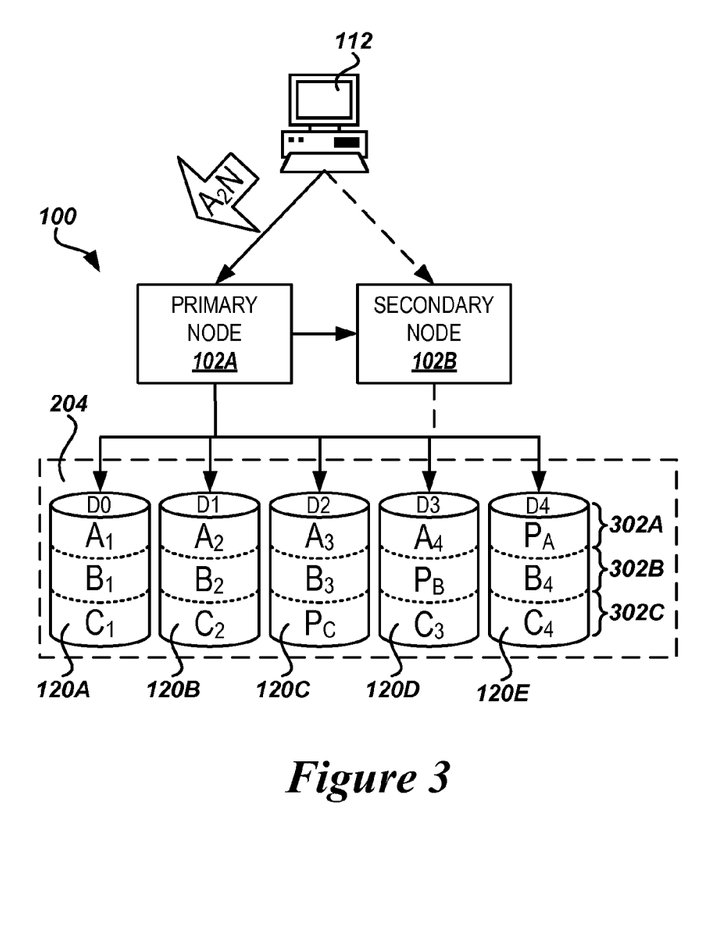
FIG. 3 is a block diagram showing further aspects of the exemplary storage cluster, including a primary storage node, a secondary storage node, and the shared RAID array, according to embodiments presented herein.

FIG. 3 shows further aspects of the exemplary storage cluster 100 described above in regard to FIG. 1. The storage cluster 100 includes a primary node 102A and a secondary node 102B. The primary storage node 102A and secondary storage node 102B are both connected to a shared RAID array 204. The example RAID array 204 shown in FIG. 3 consists of 5 physical disks 120A-120E organized as a RAID 5 array. It will be appreciated, however, that the shared RAID array 204 may comprise any number of physical disks 120 organized at any of a number of RAID levels, according to embodiments.

The data in the RAID 5 array is striped across the disks and includes parity information along with the data. As shown, the data and parity information on the physical disks 120A-120E form stripes 302A-302C (also referred to herein collectively as stripe 302). For example, the stripe 302A consists of data strip $A_1$ on disk D0 120A, data strip $A_2$ on disk D1 120B, data strip $A_3$ on disk D2 120C, data strip $A_4$ on disk D3 120D, and the parity information $P_A$ on disk D4 120E. It will be appreciated that the parity information in the RAID 5 array may be distributed, or staggered, across the disks. Thus the parity information $P_B$ for stripe 302B may be located on disk D3 120D, while the parity information $P_C$ for the stripe 302C may be located on disk D2 120C.

According to one embodiment, the primary storage node 102A has exclusive ownership of the shared RAID array 204 and services all I/O operations from the client computers 112, while the secondary storage node 102B acts as a "hot spare" capable of taking over I/O operations against the RAID array in the event of a failure of the primary node. In another embodiment, the primary and secondary storage nodes 102A, 102B operate in an Active-Passive configuration, with both nodes servicing read I/Os, but with write I/Os only serviced by the primary node.

In a further embodiment, the primary storage node 102A communicates each write I/O operation received to the secondary storage node 102B before performing the write. The secondary storage node 102B may temporarily store the write I/Os in an outstanding I/O log. In the event of a failover to the secondary storage node 102B from the primary storage node 102A, the secondary node takes ownership of the RAID array 204 and replays any outstanding writes in the log to ensure no data is lost. According to other embodiments, the initiators of any outstanding write I/Os may resend those I/Os to the secondary storage node 102B upon failure of the primary storage node 102A. Once data consistency has been established in the RAID array 204 by the secondary storage node 102B, the secondary node will perform the resent I/O operations against the array.

FIGS. 4A-4D show aspects of the operation of the primary storage node 102A and the secondary storage node 102B in the event of a failover during the processing of a write I/O. As shown in these figures, a write I/O operation 402 may arrive at the primary storage node 102A with data to be written to data strip $A_2$ in the RAID array 204. The primary storage node 102A may read the existing data strip $A_2$ from disk D1 and the existing parity information $P_A$ from disk D4, and use this information to compute the new data strip $A_2N$ and the new parity information $P_AN$ to be written to the disks. The primary storage node 102A may then initiate the writes of data strip $A_2N$ to disk D1 and parity information $P_AN$ to disk D4. It will be appreciated that these operations may be performed primarily within the RAID layer 206 of the primary storage node 102A, and that the write operations to the different physical disks D1 and D4 may be performed in parallel.

Figure 4A:
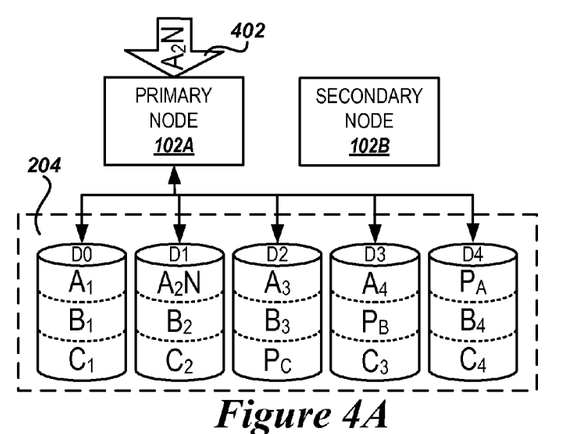
FIGS. 4A-4D are block diagrams showing aspects of the operation of the primary and secondary storage nodes of the storage cluster during a failover operation, according to embodiments presented herein.

It will be further appreciated that four possible scenarios exist for the failure of the primary storage node 102A during the writes of the new data strip $A_2N$ to disk D1 and the new parity information $P_AN$ to disk D4. First, the primary storage node 102A may fail before either write is performed, in which case the RAID array 204 will be in a consistent state. Similarly, the node may fail after both writes have been completed, in which case the RAID array 204 will still be in a consistent state. Another possible scenario is that the primary node 102A may fail after the new data strip $A_2N$ has been written to disk D1 but before the new parity information $P_AN$ has been written to disk D4. In this scenario, upon the failure of the primary storage node 102A, the RAID array 204 is left in an inconsistent state, as shown in FIG. 4A.

Figure 4B:
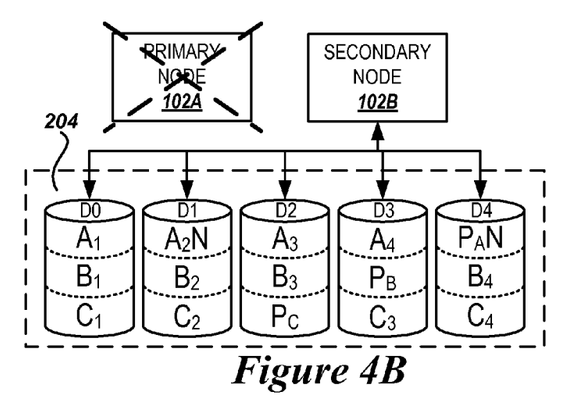

According to embodiments, upon the failure of the primary storage node 102A, the storage cluster 100 will failover to the secondary storage node 102B, which will then take ownership of the shared RAID array 204. Once the secondary storage node 102B takes ownership of the RAID array 204, the secondary node may perform a consistency check of the RAID array. For example, the secondary storage node 102B may re-compute the parity information for each stripe 302 of the RAID array 204 to which data has recently been written. In the scenario described above, this may result in the RAID array 204 being returned to a consistent state with the new data strip $A_2N$ stored on disk D1 and the newly computed parity information $P_AN$ stored on disk D4, as shown in FIG. 4B. It will be appreciated that the RAID consistency check may be performed internally in the RAID layer 206 of the secondary storage node 102B upon the secondary storage node taking ownership of the RAID array 204. Once the RAID array 204 is in a consistent state, the secondary storage node 102B may replay any outstanding write I/O operations that were not completed by the primary storage node 102A before it failed.

Figure 4C:
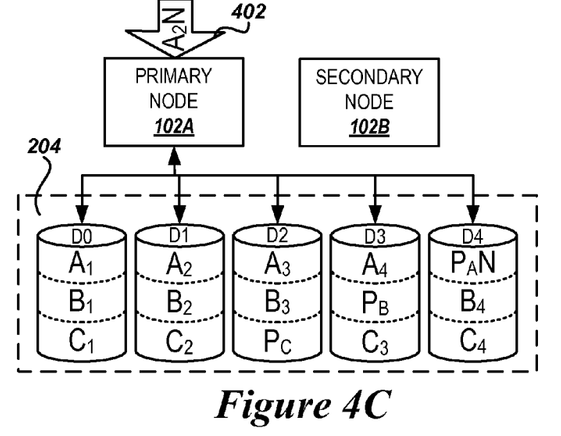
Figure 4D:
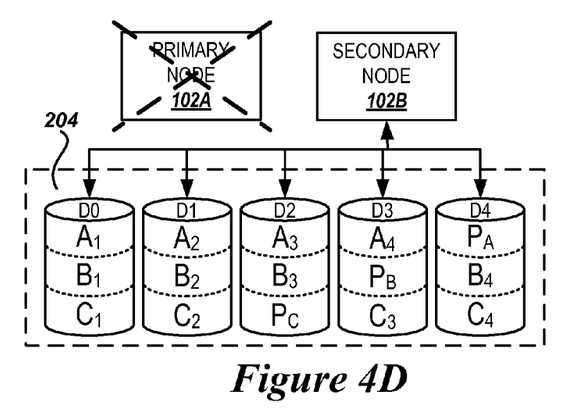

In yet another possible scenario, the primary node 102A may fail before writing the new data strip $A_2N$ to disk D1 but after writing the new parity information $P_AN$ to disk D4. This scenario also leaves the RAID array 204 in an inconsistent state, as shown in FIG. 4C. However, upon failover to the secondary storage node 102B and the execution of the RAID consistency check, the RAID array 204 may be returned to a consistent state with the old data strip $A_2$ stored on disk D1 and the parity information $P_A$ restored to disk D4, as shown in FIG. 4D. The secondary storage node 102B may then replay the outstanding write I/O operation that was not completed by the primary storage node 102A before it failed.

Figure 5A:
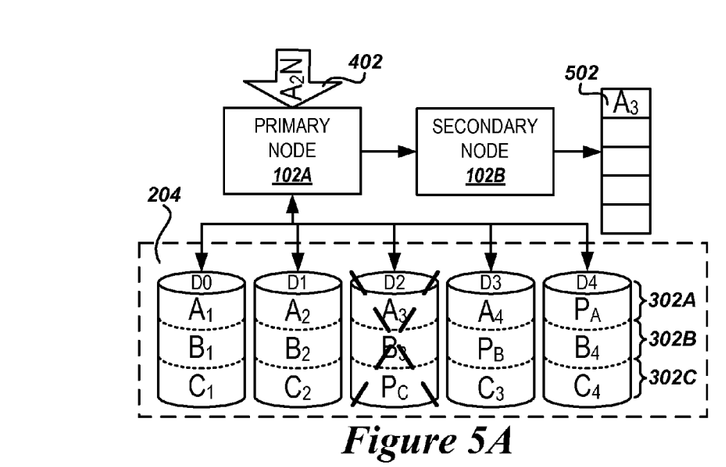
FIGS. 5A-5D are block diagrams showing aspects of the operation of the primary and secondary storage nodes of the storage cluster during a failover operation with the shared RAID array in degraded mode, according to embodiments presented herein.

FIGS. 5A-5D show aspects of the operation of the primary storage node 102A and the secondary storage node 102B in the event of a failover when the shared RAID array 204 is in a degraded mode. The RAID array 204 may be in a degraded mode due to the failure of one of the physical disks 120A-120E, such as disk D2 shown in FIGS. 5A-5D. According to embodiments, when the RAID array 204 is in a degraded mode, upon receiving a write I/O operation 402, the primary storage node 102A first reads the missing data strip from the stripe 302 targeted by the write. For example, as shown in FIG. 5A, if the disk D2 has failed, the missing data strip $A_3$ is read from the RAID array 204 when the write I/O 402 targeting data strip $A_2$ is received at the primary storage node 102A.

The volume module 208 on the primary storage node 102A then communicates the missing data strip $A_3$ to the volume module on the secondary storage node 102B, where the volume module on the secondary node stores the missing data strip A3 in an outstanding strip log 502, as further shown in FIG. 5A. The outstanding strip log 502 may be stored in a volatile or non-volatile memory area of the secondary storage node 102B, such as in RAM 108 or in an NVRAM storage area. Each entry of the outstanding strip log 502 may provide an area to store the data for the data strip as well as an area to identify the location of the data strip in the RAID array 204. According to one embodiment, the volume modules 208 of the respective storage nodes 102 communicate with each other through the through the bus 122 connecting the storage nodes to the physical disks 120, such as the SBB mid-plane described above in regard to FIG. 1. In another embodiment, the volume modules 208 may communicate over a network 114 through the network controllers 110 on their respective storage nodes 102.

After communicating the missing data strip $A_3$ to the secondary storage node 102B, the primary storage node 102A computes the new data strip $A_2N$ and parity information $P_AN$, and then initiates the writes of the new data strip and new parity information to the disks. Once the I/O is completed by the primary storage node 102A, the secondary storage node 102B may be notified to clear the outstanding strip log 502. However, this may add to the I/O latency for the initiator of the I/O, since it must wait until the clear instruction is executed by the secondary storage node 102B.

In an alternative embodiment, the size of the outstanding strip log 502 on the secondary storage node 102B is set to be equal to the size of the outstanding I/O log supported by the underlying RAID layer 206. This ensures that the secondary storage node 102B can store in the outstanding strip log 502 missing data strips corresponding to all of the I/Os that are still pending on the primary storage node 102A. Further, if the secondary storage node 102B receives the same data strip a second time from the primary storage node 102A, it will replace the old data strip with the new one. This may happen if two or more data strips in a stripe are written consecutively. Also, if a write I/O occurs to the missing data strip, then the primary storage node 102A will send the newly written data to the secondary storage node 102B, instead of sending the old data calculated from the remaining data strips in the stripe. Since the secondary storage node 102B will always replace the previously present data strip in the outstanding strip log with a new one if received from the primary storage node 102A, the secondary storage node 102B will always have the correct data to rewrite to the RAID array 204 in the event of a failover.

Figure 5B:
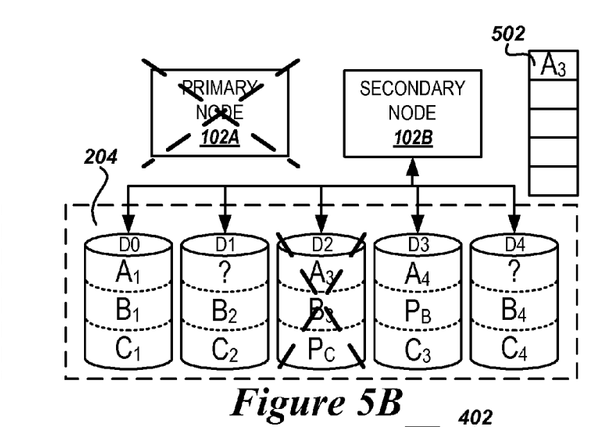

As described above in regard to FIGS. 4A and 4C, if the primary storage node 102A fails during the writes of the new data or parity information, the RAID array 204 may be left in an inconsistent state, as shown in FIG. 5B. Further, it will be appreciated that, because the RAID array 204 is in degraded mode, the RAID consistency check described above in regards to FIGS. 4B and 4D will not be able to restore the RAID array 204 to a consistent state. However, upon failover to the secondary storage node 102B, the volume module 208 on the secondary node may utilize the data strip(s) stored in the outstanding strip log 502 to restore the data consistency of the RAID array 204, according to embodiments.

Figure 5C:
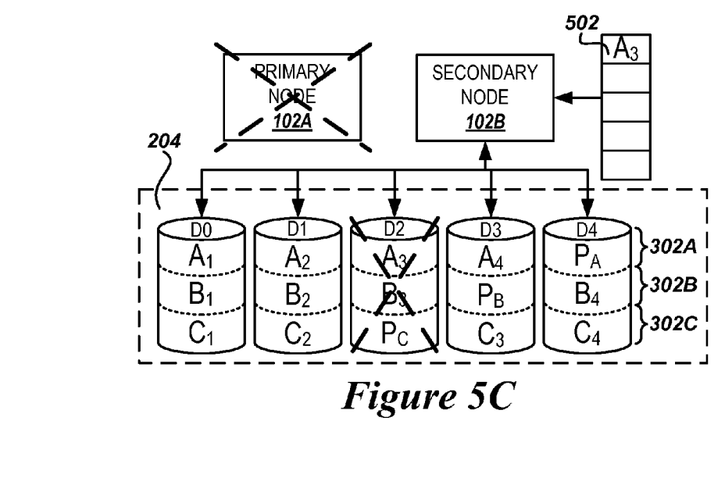
Figure 5D:
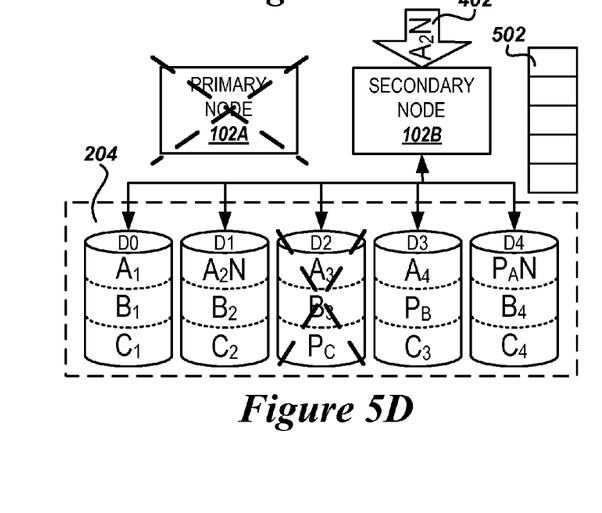

For example, as shown in FIG. 5C, upon failure of the primary storage node 102A, the secondary storage node 102B will take ownership of the RAID array 204. The volume module 208 of the secondary storage node 102B may then retrieve the missing data strip $A_3$ from the outstanding strip log 502 and, utilizing aspects of the routine 600 described below in regard to FIG. 6, restore the RAID array 204 to a consistent state. Once the data consistency of the RAID array 204 has been restored, the secondary storage node 102B may replay any outstanding write I/O operations 402 that were not completed by the primary storage node 102A before it failed, as shown in FIG. 5D.

Figure 6A:
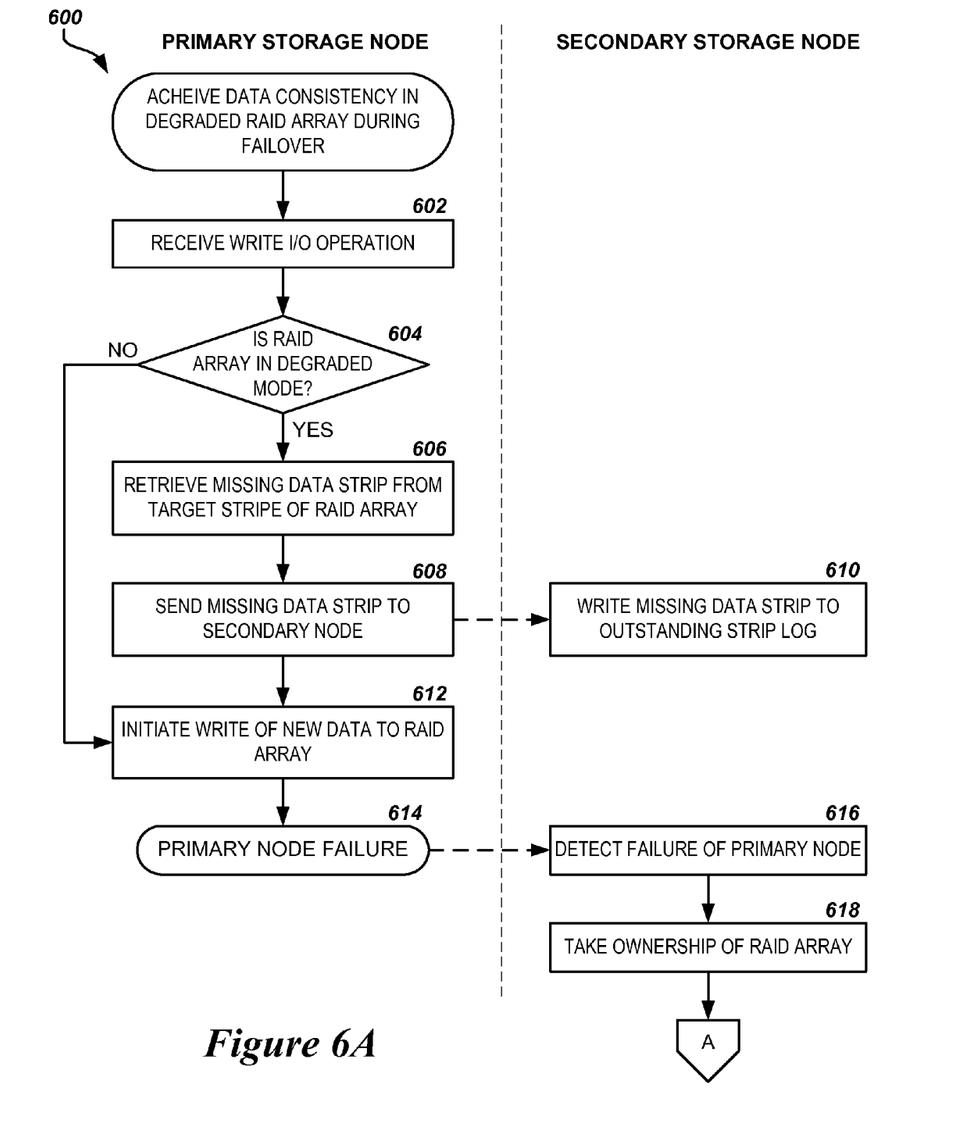
FIGS. 6A and 6B are logical flow diagrams illustrating one method for achieving data consistency during a failover from a primary node to a secondary node with a shared RAID array in degraded mode, according to embodiments presented herein.
Figure 6B:
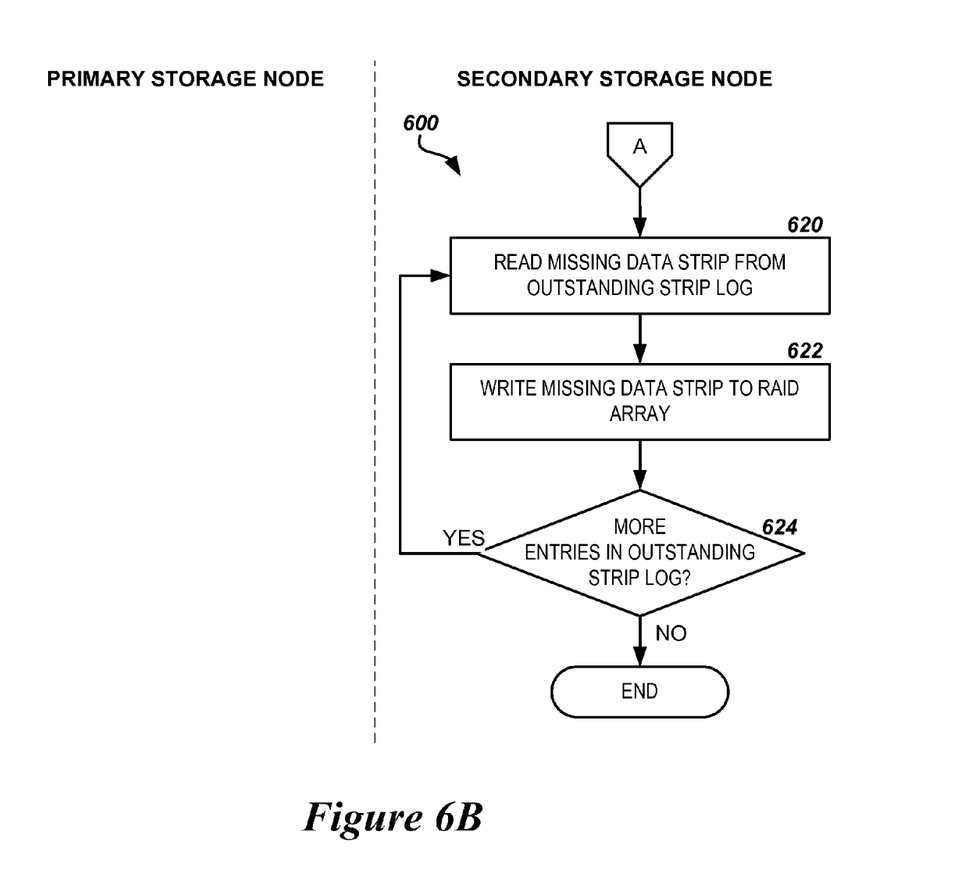

Turning now to FIGS. 6A and 6B, additional details will be provided regarding the embodiments presented herein for achieving data consistency during a failover from a primary node to a secondary node in a storage cluster with a shared RAID array in a degraded mode. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIGS. 6A and 6B show a routine 600 for restoring data consistency in a degraded RAID array 204 upon failover from a primary storage node 102A to a secondary storage node 102B in a storage cluster 100. According to one embodiment, the routine 600 may be implemented by the respective volume modules 208 executing on the primary storage node 102A and the secondary storage node 102B. The routine 600 begins with operation 602 shown in FIG. 6A, where the volume module 208 on the primary storage node 102A receives a write I/O operation for the shared RAID array 204. For example, as shown in FIG. 5A, the primary storage node 102A may receive a write I/O operation 402 with data destined for the $A_2$ data strip in the RAID array 204.

Upon receiving the write I/O operation, the routine 600 proceeds from operation 602 to operation 604, where the volume module 208 on the primary storage node 102A detects whether the RAID array 204 is in degraded mode. As discussed above, the RAID array 204 may be in a degraded mode due to the failure of one of the physical disks 120A-120E, for example. If the RAID array 204 is not in degraded mode, the routine 600 proceeds to operation 612, where the volume module 208 on the primary storage node 102A initiates the write to the RAID array 204. The computation of the new data strip $A_2N$ and parity information $P_A$ may be performed by the RAID layer 206 on the node, and the RAID layer may issue the write operations to the physical disks 120 in the RAID array 204 in parallel. Since the RAID array 204 is not in degraded mode, the RAID consistency check performed by the RAID layer 206 on the secondary storage node 102B, described above in regard to FIGS. 4B and 4D, should restore the RAID array to a consistent state in the event of a failure of the primary storage node 102A during the write operation.

If the RAID array 204 is in degraded mode, the routine 600 proceeds from operation 604 to operation 606, where the volume module 208 on the primary storage node 102A retrieves the missing data strip from the stripe 302 targeted by the pending I/O operation. For example, as shown in FIG. 5A, a write I/O operation 402 targeting the data strip $A_2$ will cause the volume module 208 to retrieve the data strip located on the missing disk D2 in the same stripe 302A as the target data strip, or data strip $A_3$. In one embodiment, the volume module 208 requests the missing data strip $A_3$ from the RAID layer 206 of the node. The volume module 208 on the primary storage node 102A may request the specific data strip through an API provided by the RAID layer 206, or the module may compute the block(s) of data comprising the data strip utilizing knowledge of the layout of the data in the RAID array 204. For example, the volume module 208 may utilize information such as the RAID level, the stripe size, the block size, and the left or right symmetry of the RAID array 204 to compute the blocks of data to request from the RAID layer 206 in order to retrieve the entire missing data strip $A_3$. It will be appreciated that the RAID layer 206 may retrieve the data for the missing data strip $A_3$ on the failed disk by reading the data strips $A_1$, $A_2$, and $A_4$ along with the parity information $P_A$ from the remaining disks, and then computing the missing data strip $A_3$ from the read data.

From operation 606, the routine 600 proceeds to operation 608, where the volume module 208 on the primary storage node 102A sends the missing data strip retrieved from the RAID array 204 to the secondary storage node 102B. As described above, the volume module 208 on the primary storage node 102A may send the missing data strip to the secondary storage node 102B through the through the bus 122 connecting the storage nodes to the physical disks 120, such as by sending a SAS or SCSI command through the SBB mid-plane, for example. Alternatively, the volume module 208 on the primary storage node 102A may send the missing data strip to the secondary storage node 102B over the network 114, utilizing a TCP connection established between the primary and secondary storage nodes, for example.

At operation 610, when the missing data strip is received by the volume module 208 on the secondary storage node 102B, the volume module writes the missing data strip to the outstanding strip log 502. For example, as shown in FIG. 5A, the secondary storage node 102B writes the received missing data strip $A_3$ to the first entry in the outstanding strip log 502. It will be appreciated that the outstanding strip log 502 may contain several entries containing missing data strips, depending on the number of outstanding write I/O operations pending at the primary storage node 102A. The secondary storage node 102B may periodically purge the entries which have expired from the outstanding strip log 502. Outstanding strip log entries may be set to expire after the timeout limit of I/O initiators to the storage cluster 100, for example.

Next, the routine 600 proceeds from operation 608 to operation 612, where the volume module 208 on the primary storage node 102A initiates the writes to the RAID array 204 through the RAID layer 206. As described above in regard to FIGS. 5A-5D, if the primary storage node 102A fails during the writes to the RAID array 204, as shown in operation 614, the storage cluster will failover to the secondary storage node 102B. At operation 616, the secondary storage node 102B detects the failure of the primary node, and the routine 600 proceeds from operation 616 to operation 618, where the secondary storage node 102B takes ownership of the shared RAID array 204. This may involve the RAID layer 206 on the secondary storage node 102B discovering the parameters of the RAID array 204 and performing any initialization and recovery functions necessary to take ownership of the array. According to one embodiment, the volume module 208 on the secondary storage node 102B detects that the RAID array 204 is in degraded mode and instructs the RAID layer 206 not to perform the RAID consistency checks described above in regard to FIGS. 4B and 4D.

From operation 618, the routine 600 proceeds to operation 620 on FIG. 6B, where the volume module 208 on the secondary storage node 102B reads the first entry from the outstanding strip log 502 representing the first stripe 302 for which there was an outstanding write when the primary storage node 102A failed. For example, as shown in FIG. 5C, the volume module 208 reads the missing data strip $A_3$ from the outstanding strip log 502 that was sent from the primary storage node 102A in conjunction with the write I/O operation 402 targeting the stripe 302A.

The routine 600 then proceeds from operation 620 to operation 622, where the volume module 208 on the secondary storage node 102B writes the missing data strip retrieved from the outstanding strip log 502 to the RAID array 204. In the example shown in FIG. 5C, the volume module 208 writes data strip $A_3$ to the RAID array 204. As discussed above in regard to the primary storage node 102A, the volume module 208 on the secondary storage node 102B may write the specific data strip to the RAID array 204 through an API provided by the RAID layer 206, or the module may compute the block(s) of data comprising the data strip utilizing knowledge of the layout of the data in the RAID array.

It will be appreciated that writing the missing data strip $A_3$ to the RAID array 204 at operation 622 will cause the RAID layer 206 to read the remaining data strips $A_1$, $A_2$, and $A_4$ from the stripe 302A of the RAID array containing the missing data strip $A_3$ and calculate new parity information $P_A$ from the missing data strip $A_3$ retrieved from the outstanding strip log 502 and the remaining data strips $A_1$, $A_2$, and $A_4$ read from the RAID array. The RAID layer 206 will then perform a full-stripe write of the stripe 302A to the RAID array 204, rewriting the data strips $A_1$, $A_2$, and $A_4$ to the corresponding disks D0, D1, and D3, and the parity information $P_A$ to disk D5. This process allows the RAID layer 206 to avoid the data inconsistencies that may exist in the stripe 302A resulting from the failure of the primary storage node 102A while executing the write I/O operation. Thus, the stripe 302A of the RAID array 204 is restored to a consistent state.

Next, the routine 600 proceeds from operation 622 to operation 624, where the volume module 208 on the secondary storage node 102B determines if more entries exist in the outstanding strip log 502. If more entries exist in the outstanding strip log 502, then the routine 600 returns to operation 620 to process the next entry in the log. If no more entries exist in the outstanding strip log 502, the routine 600 ends.

It will be appreciated that, if the I/O write operation received at operation 602 targets the data strip stored on the missing disk of the degraded RAID array 204, only one physical write (the parity information) will be required by the RAID layer 206 to complete the write I/O. Therefore, there is little danger that the RAID array will be left in an inconsistent state if the primary storage node 102A were to fail during the write. In this scenario, the volume module 208 on the primary storage node 102A may choose not to send the missing data strip to the secondary storage node 102B for entry into the outstanding strip log 502, thus avoiding an unnecessary restore operation of the stripe 302 containing the missing data strip upon the secondary node taking control of the RAID array 204.

Based on the foregoing, it should be appreciated that technologies for achieving data consistency during a failover from a primary node to a secondary node in a storage cluster with a shared RAID array in a degraded mode are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for restoring data consistency in a RAID array in a degraded mode upon failover from a primary storage node of a storage cluster to a secondary storage node of the storage cluster, the method comprising:
   receiving a write input/output ("I/O") operation at the primary storage node;
   upon receiving the write I/O operation when the RAID array is in a degraded mode, reading a missing data strip from the RAID array corresponding to the stripe targeted by the write I/O operation;
   sending the missing data strip to the secondary storage node;
   taking ownership of the RAID array upon failure of the primary storage node;
   reading the missing data strip from an outstanding strip log, wherein a size of the strip log is set to be at least a size of an outstanding input/output ("I/O") log supported by the underlying RAID array; and
   writing the missing data strip to the RAID array, wherein writing the missing data strip to the RAID array transforms the stripe on the RAID array containing the data strip from an inconsistent state to a consistent state,
   wherein the primary storage node processes all write I/O operations for the RAID array in the storage cluster, and wherein both the primary storage node and the secondary storage node process read I/O operations for the RAID array in the storage cluster.

2. The method of claim 1, further comprising:
   receiving the missing data strip at the secondary storage node; and
   storing the missing data strip in the outstanding strip log.

3. The method of claim 1, further comprising performing the steps of reading the missing data strip from the outstanding strip log and writing the missing data strip to the RAID array for each of a plurality of missing data strips in the outstanding strip log.

4. The method of claim 1, further comprising upon taking ownership of the RAID array, causing a RAID layer controlling the RAID array not to perform a RAID consistency check function on the RAID array.

5. The method of claim 1, wherein the primary storage node processes all I/O operations for the RAID array in the storage cluster, and wherein the secondary storage node operates as a hot-spare.

6. The method of claim 1, wherein the RAID array comprises a RAID 5 array.

7. The method of claim 1, wherein the primary storage node and the secondary storage node are connected to the RAID array through a storage bridge bay ("SBB") mid-plane bus.

8. A computer-readable storage medium having computer-executable instructions stored thereon that, when executed by a primary storage node in a storage cluster comprising the primary storage node and a secondary storage node, cause the primary storage node to:
   receive a write input/output ("I/O") operation;
   upon receiving the write I/O operation when the shared RAID array is in a degraded mode, read a missing data strip from the shared RAID array corresponding to the stripe targeted by the write I/O operation; and
   send the missing data strip to the secondary storage node, the computer-readable storage medium having further computer-executable instructions stored thereon that, when executed by the secondary storage node, cause the secondary storage node to:
   receive the missing data strip from the primary storage node;
   upon receiving the missing data strip, store the missing data strip in an outstanding strip log, wherein a size of the strip log is set to be at least a size of an outstanding input/output ("I/O") log supported by the underlying RAID array;
   detect a failure of the primary storage node;
   upon detecting the failure of the primary storage node, take ownership of a shared RAID array in the storage cluster;
   read the missing data strip from the outstanding strip log; and
   write the missing data strip to the RAID array, wherein writing the missing data strip to the RAID array transforms the stripe on the RAID array containing the data strip from an inconsistent state to a consistent state,
   wherein the primary storage node processes all I/O operations for the RAID array in the storage cluster, and wherein both the primary storage node and the secondary storage node process read I/O operations for the RAID array in the storage cluster.

9. The computer-readable storage medium of claim 8, having further computer-executable instructions stored thereon that, when executed by the secondary storage node, cause the secondary node to repeat the steps of reading the missing data strip from the outstanding strip log and writing the missing data strip to the RAID array for each of a plurality of missing data strips in the outstanding strip log.

10. The computer-readable storage medium of claim 8, having further computer-executable instructions stored thereon that, when executed by the secondary storage node, cause the secondary node to, upon taking ownership of the RAID array, cause a RAID layer controlling the shared RAID array not to perform a RAID consistency check function on the RAID array.

11. The computer-readable storage medium of claim 8, wherein the shared RAID array comprises a RAID 5 array.

12. The computer-readable storage medium of claim 8, wherein the primary storage node and the secondary storage node are connected to the shared RAID array through a storage bridge bay ("SBB") mid-plane bus.

13. A system for ensuring data consistency in a shared RAID array in a degraded mode upon failover from a primary storage node of a storage cluster to a secondary storage node of the storage cluster, the system comprising:
   the shared RAID array comprising a plurality of physical storage devices containing data striped across the plurality of physical storage devices according to a RAID level;
   the primary storage node operatively connected to the shared RAID array and executing a volume module configured to
   receive a write input/output ("I/O") operation, upon receiving the write I/O operation when the shared RAID array is in a degraded mode,
read a missing data strip from the shared RAID array corresponding to the stripe targeted by the write I/O operation, and
send the missing data strip to the secondary storage node; and the secondary storage node operatively connected to the shared RAID array and executing the volume module further configured to
receive the missing data strip from the primary storage node;
upon receiving the missing data strip, store the missing data strip in an outstanding strip log, wherein a size of the strip log is set to be at least a size of an outstanding I/O log supported by the underlying RAID array;
detect a failure of the primary storage node;
upon detecting the failure of the primary storage node, take ownership of the shared RAID array;
read the missing data strip from the outstanding strip log; and
write the missing data strip to the RAID array, wherein writing the missing data strip to the RAID array transforms the stripe on the RAID array containing the data strip from an inconsistent state to a consistent state,
wherein the primary storage node processes all write I/O operations for the RAID array in the storage cluster, and wherein both the primary storage node and the secondary storage node process read I/O operations for the RAID array in the storage cluster.

14. The system of claim 13, wherein the volume module on the secondary storage node is further configured to perform the steps of reading the missing data strip from the outstanding strip log and writing the missing data strip to the RAID array for each of a plurality of missing data strips in the outstanding strip log.

15. The system of claim 13, wherein the volume module on the secondary storage node is further configured to, upon taking ownership of the shared RAID array, cause a RAID layer controlling the shared RAID array not to perform a RAID consistency check function on the shared RAID array.

16. The system of claim 13, wherein the primary storage node processes all I/O operations for the storage cluster, and wherein the secondary storage node operates as a hot-spare.

* * * * *